United States Patent
Esser et al.

(10) Patent No.: US 9,381,576 B2
(45) Date of Patent: Jul. 5, 2016

(54) CHUCK FOR APPARATUS FOR MACHINING A TUBULAR ROTATING WORKPIECE

(71) Applicants: Karl-Josef Esser, Moenchengladback (DE); Rainer Derix, Heinsberg (DE)

(72) Inventors: Karl-Josef Esser, Moenchengladback (DE); Rainer Derix, Heinsberg (DE)

(73) Assignee: SMS MEER GmbH, MOENCHENGLADBACH (DE)

( * ) Notice: Subject to any disclaimer, the term of this patent is extended or adjusted under 35 U.S.C. 154(b) by 142 days.

(21) Appl. No.: 14/347,094

(22) PCT Filed: Oct. 9, 2012

(86) PCT No.: PCT/EP2012/004217
§ 371 (c)(1),
(2) Date: Mar. 25, 2014

(87) PCT Pub. No.: WO2013/068067
PCT Pub. Date: May 16, 2013

(65) Prior Publication Data
US 2014/0284889 A1 Sep. 25, 2014

(30) Foreign Application Priority Data

Nov. 8, 2011 (DE) .......................... 10 2011 117 881

(51) Int. Cl.
*B23B 31/16* (2006.01)
*B23B 31/12* (2006.01)

(52) U.S. Cl.
CPC .............. *B23B 31/16* (2013.01); *B23B 31/1223* (2013.01); *B23B 31/16066* (2013.01);
(Continued)

(58) Field of Classification Search
CPC .................. Y10T 279/1926; Y10T 279/1933; Y10T 279/1941; Y10T 279/26; Y10T 279/119; Y10T 279/1913; Y10T 279/1921; Y10T 279/1946; B23B 31/1223; B23B 31/16066; B23B 31/16045; B23B 2231/22; B23B 2270/12
See application file for complete search history.

(56) References Cited

U.S. PATENT DOCUMENTS 730,123 A * 6/1903 Hudson ................... B23B 49/04
279/113
3,560,009 A * 2/1971 Renoux ............... B23B 31/1253
279/120

(Continued)

FOREIGN PATENT DOCUMENTS

DE 3304876 A 8/1984
DE 102006027988 A 12/2007

(Continued)

*Primary Examiner* — Eric A Gates
*Assistant Examiner* — Chwen-Wei Su
(74) *Attorney, Agent, or Firm* — Andrew Wilford (57) ABSTRACT

The invention relates to a chuck (1) for a machine tool for machining a tubular workpiece (26) which rotates about a rotational axis that coincides with the center of the chuck, comprising at least two chucking slides (7a, b, c) that are designed to be positionable radially with respect to the rotational axis in order to release and chuck the workpiece, are arranged on the end side of and in a manner distributed uniformly around the circumference of a chuck head plate, and bear chucking jaws (8a, b, c). Such a chuck is intended to be created with improved operating characteristics and extension to all chucking functions. To this end, for the external central chucking of a tube (26), there are provided centring slides (27a, b, c) which can be disengaged from the chuck head plate with a forward inclination towards the end of the tube to be machined and center the tube by means of chucking claws (29) which are arranged at the front, free end of centring slide rods (28), said centring slides (27a, b, c) engaging via a toothed rod section (34) into a toothing (35) of a drive means assigned to each centring slide, and meshing for their part, on a toothing side (37) parallel to the side with the toothing, with a central toothed wheel (33) arranged concentrically with the rotational axis, wherein the central toothed wheel (33) synchronizes the movements of all the centring slides (27a, b, c).

9 Claims, 8 Drawing Sheets

(52) U.S. Cl.
CPC ......... *B23B2231/00* (2013.01); *B23B 2231/22* (2013.01); *B23B 2270/12* (2013.01); *Y10T 279/17666* (2015.01); *Y10T 279/1913* (2015.01); *Y10T 279/1921* (2015.01); *Y10T 279/1926* (2015.01); *Y10T 279/1946* (2015.01)

(56) References Cited

U.S. PATENT DOCUMENTS

| | | | | |
|---|---|---|---|---|
| 3,751,053 | A | * | 8/1973 | Swanson ............ B23B 31/1622 279/119 |
| 3,814,448 | A | | 6/1974 | Buck |
| 4,482,162 | A | * | 11/1984 | Anegawa ............ B23B 31/1223 279/119 |
| 4,585,240 | A | * | 4/1986 | Giffin ................ B23B 31/16008 279/111 |
| 4,838,561 | A | * | 6/1989 | Baranzelli ......... B23B 31/16241 279/114 |
| 6,116,617 | A | * | 9/2000 | Kofler ................ B23B 31/1253 279/106 |

FOREIGN PATENT DOCUMENTS

| | | |
|---|---|---|
| DE | 102009053679 A | 6/2010 |
| JP | 14-19107 | 12/1939 |
| JP | 52-153288 | 12/1977 |

* cited by examiner

CHUCK FOR APPARATUS FOR MACHINING A TUBULAR ROTATING WORKPIECE

CROSS REFERENCE TO RELATED APPLICATIONS

This application is the US-national stage of PCT application PCT/EP2012/004217 filed 9 Oct. 2012 and claiming the priority of German patent application 102011117881.7 itself filed 8 Nov. 2011.

FIELD OF THE INVENTION

The invention relates to a chuck for an apparatus for machining a tubular workpiece rotating about an axis that coincides with the center of the chuck, comprising at least two jaw slides that are designed to be positionable radially with respect to the rotation axis in order to release and grip the workpiece, and are mounted on an end face of and angularly equispaced on a chuck head plate.

BACKGROUND OF THE INVENTION

An apparatus for machining tube ends, in particular for cutting threads in a tubular workpiece rotating about an axis, is known from DE 10 2009 053 679. The tube thread is generally manufactured at the tube end of the chucked tubular workpiece or tube for a one-time run-over of the tools commonly arranged in a turret head, the movements of the tools being controlled numerically. To chuck the tube, a machining apparatus has a front end chuck—where the turret head is employed with the tools—and a rear end chuck at the rear, both chucking the tube concentrically with respect to the rotation axis. A machining center with a minimum of two opposing machining apparatuses is equipped with four chucks. Both the front end chuck and the rear end chuck preferably have three jaw slides with jaws.

Such thread-cutting machines with a rotating tube and turret heads with fitted tools that are controlled via NC axes, require machining multiple chucking functions. The tubes must be able to be chucked compensating—first—centrally, with direct orientation toward the center of the machine, and—second—with adjustment to, thirdly, eccentrically chucked tubes. By external centered chucking is meant an additional chucking of the tube ends protruding from the front end chuck in the area of or close to the subsequently to be manufactured thread. This is accompanied by a compensating chucking by means of the jaw slides of the front end chucks if the jaw slides can be applied to the tube that is somewhat curved over the length, where applicable, in a compensating manner and thus not exactly centrally. Thus, such front end chucks are very complex and the chucking and releasing of the jaw slides or the jaws carried by them is implemented via wedge systems with rectangular redirection parallel to the center or rotation axis of the chuck, for the embodiment forms known in the field. This entails large diameters and lengths of the chucks with a respectively large mass, which is disadvantageous for operation.

OBJECT OF THE INVENTION

The object of the invention is therefore to provide a chuck, particularly a front end chuck, of the type described above with improved operational characteristics for centered, compensating and eccentric chucking, where front and rear end chucks can be have with the same parts and a front end chuck can be supplemented or modified with the functions of centered and compensating chucking by an integrated external centered chucking system.

SUMMARY OF THE INVENTION

This object is attained according to the invention in that for the external centering chucking of a tube, there are centering slides that have centering slide rods axially forwardly and radially inwardly shiftable from a chuck head plate toward the end of the tube to be machined so as to center the tube by jaws at their front ends, respective racks of the slides engaging with teeth on one side of respective drives and each also meshing with teeth on an opposite side parallel to the one side with a central gear mounted concentrically with the rotation axis such that the central gear synchronizes movements of all the centering slides. By coupling all of the three present centering slides via their drives with the central gear common to them, the centering slides are synchronously moved forward with the fitted jaws during application of the drives, and will always chuck a tube centrally in an area upstream of the thread to be cut, i.e. the jaws will attach exactly to the tube shortly before the tube end. Therefore, the free chucking length of the tube, which protrudes from the jaws of the centering slides, is very small, which facilitates precise cutting of the thread.

A preferred suggestion of the invention provides that the drives of the centering slides are designed as hollow cylinders each provided internally with a piston provided that is acted upon by pressure and that has a supply rod for means at its two pressure sides with the supply rods for pressure extending out from the ends of the hollow cylinder, the hollow cylinder thus sliding toward the one or the other side above the respective piston during pressurization of the one or the other piston side of the piston and in doing so, pulls in the centering slide or pushes it out toward the front to chuck the tube. This achieves a compact design for the arrangement or mounting of the externally center slides in or onto the chuck.

An easy assembly results from enclosing the centering slide rods in a housing sleeve—which is provided with a mounting flange at its front end that is remote from the tooth rod section of the centering slides—to attach the chucking head plate with a mounting flange. The centering slides can be inserted with their centering rods from the front into the chuck head plate and subsequently bolted to such plate via the mounting flange.

According to a preferred embodiment of the invention, the centering slides are provided in addition to above-described slides, so that every jaw slide is associated with a cross slides provided in the head plate movable tangentially to the rotation axis and acted upon by positioning means, on the one hand, and with separate, gears meshing with the racks, on the other hand, whereby each jaw slide is provided with a follower claw at its bottom side that serves to redirect the positioning movement of the cross slide into a movement of the jaw slide that is perpendicular with respect to the rotation axis, and is engaged with a link-type guide groove provided in the slide block of the cross slide, and whereby the gears are associated with an axial coupling pinion that can be inserted or released axially to the rotation axis. Thus, a chuck can be achieved, particularly a front end chuck that concentrates and unifies any desired chucking functions, i.e. including external centered chucking, into the chuck itself. In doing so, a redirection of movement is possible without wedge systems and parallel to the center of the chuck via engaging of the cross slide that is acted upon by positioning means, with the jaw slides on the plane of the head plate, immediately perpendicular with respect to the rotation axis. This results in less mass accompanied by increased dynamics as well as shortened start-up and slow-down times of the unavoidable cycles after every machining. During chucking and releasing of the tube, large areas—that is, those of the follower claw and the guide groove, in which the follower claw is displaced in a forced-guided way during positioning movements of the cross slides in a form-fit sliding manner—transfer high forces with favorable contact pressure. The centered and compensating and externally centered chucking does not require any enlarging of the design height or design length of the chuck. Centered chucking is implemented via the separate gears connected with one jaw slide whose synchronous operation and thus that of the three gears, as well, guarantees the inserted coupling pinion, whereas a balanced chucking is facilitated with a disengaged coupling pinion.

An advantageous suggestion of the invention provides that insertable and disengageable coupling pinions are engaged with all three gears in the inserted final position and with only one gear in the disengaged final position. Inserting and disengaging of the coupling pinion can be implemented manually, freely accessible from the front end of the chuck or the head plate, whereby all three slide systems and the associated gears move independently from one another with the coupling pinion disengaged to fit off-centered to and chuck the tube.

In an advantageous continued development of the invention, the cross slide and the jaw slide cross one another at an acute pressure angle of between a tangent and the travel path of the follower claw and guide groove, which is transferred to a positioning stroke of the cross slide with reduction to the positioning stroke of the cross slide. If such angle is 30°, a reduction of 1 to 2 (the sine of 30° corresponds to 0.5) can be achieved, which facilitates fast chucking and releasing.

According to one configuration of the invention, a cylinder is provided as positioning means of the cross slides so that the slide block of the cross slides is connected via a piston rod with the cylinder piston. The required movement during chucking and releasing can therefore be easily performed.

According to an advantageous suggestion of the invention, an indicator bolt is provided in the chuck head plate extending axially parallel to the coupling pinion is linked to move synchronously with the coupling pinion, and visible from the outside by its front end section in the head plate and identifying the inserted and disengaged positions of the coupling pinion. The machine operator thus always has knowledge of the current functional position of the coupling pinion and can insert or disengage the coupling pinion, depending on the machining requirement (centered with direct alignment to the center of the machine or balanced chucking).

BRIEF DESCRIPTION OF THE DRAWING

Further features and details of the invention are described the following description of embodiments shown in the drawings, in which.

SPECIFIC DESCRIPTION OF THE INVENTION

Figure 1:
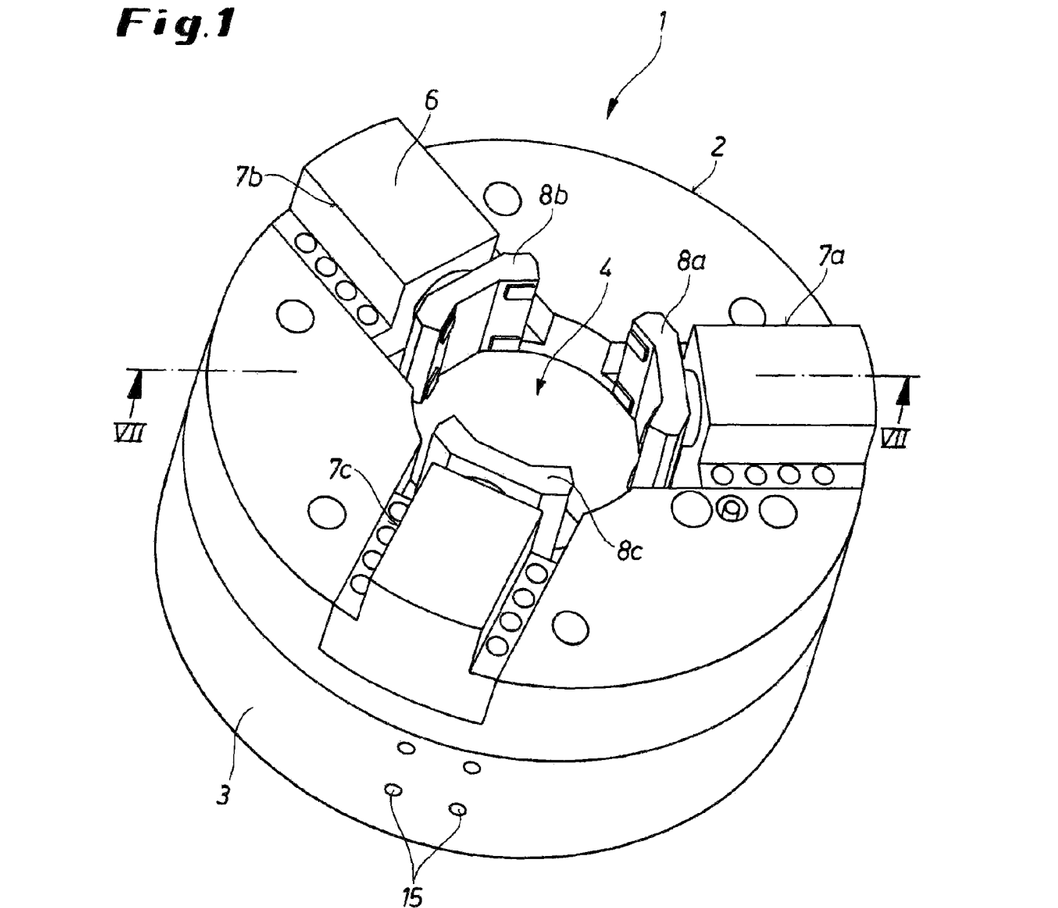
FIG. 1 is a perspective front view, of part of a machining apparatus.
Figure 6:
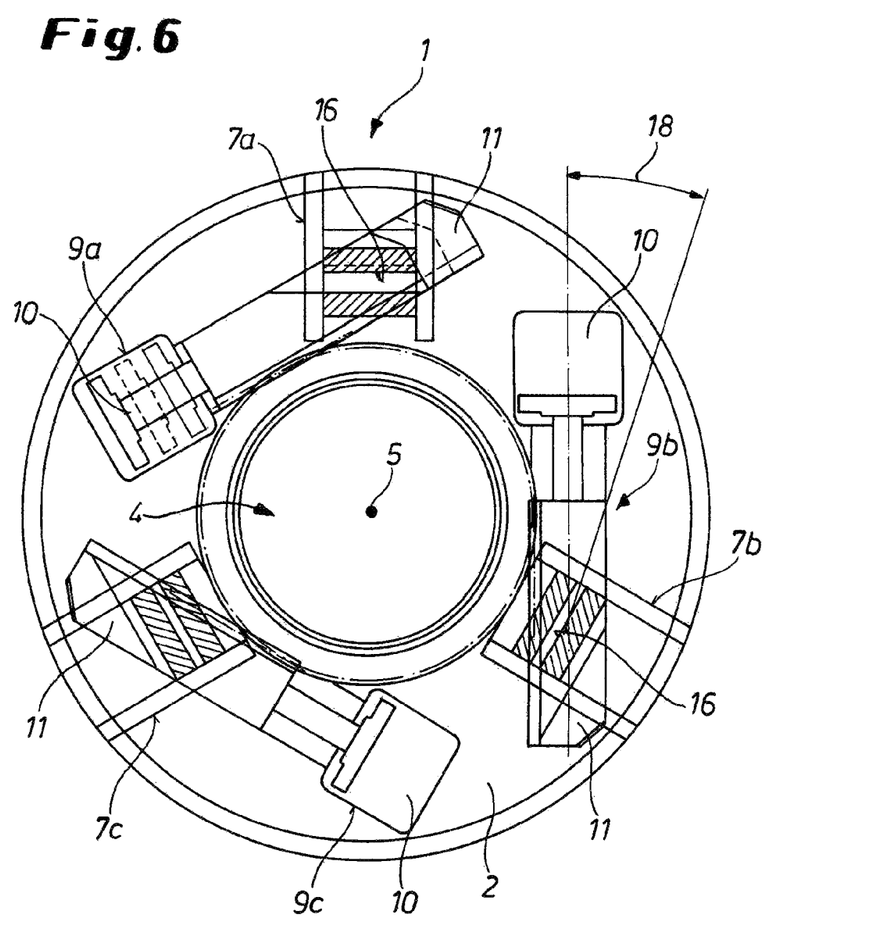
FIG. 6 is a rear schematic view like FIG. 5 of the chuck as a principal outline with association of the cross slides to the jaw slides in an inclined position crossing one another at a pressure angle.
Figure 7:
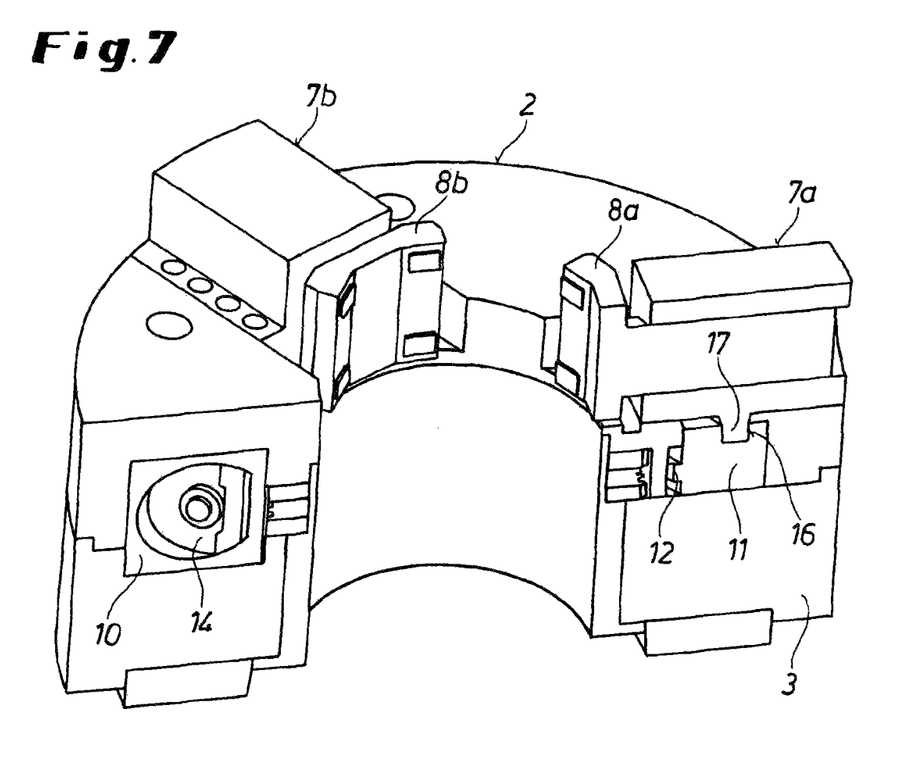
FIG. 7 shows the chuck of FIG. 1 in a longitudinal section, approximately along line VII-VII [of FIG. 1]

A chuck 1 of a machining apparatus for cutting threads or threaded connections at tube ends is shown in FIG. 1. It consists of a head plate 2 having a rear face carrying a housing ring 3. To accept a tubular workpiece 26 to be machined (FIG. 2), the chuck 1 has a central through going passage 4 whose center axis 5 coincides with a rotation axis of the rotating tube in the chuck. Three movable jaw slides 7a, 7b, and 7c with covers 6 and respective jaws 8a, 8b, and 8c are carried on a front face of the head plate 2, angularly equispaced about and radially equispaced from the center chuck axis 5 for bearing on the tube radially inwardly toward the center rotation axis 5 (FIG. 6).

To position the jaw slides 7a, 7b, and 7c with the respective jaws 8a, 8b, and 8c radially relative to the rotation axis 5 of the chuck 1, each jaw slide 7a, 7b, and 7c is associated with a respective cross slide 9a, 9b, and 9c shiftable tangentially to the chuck axis 5 and set in the head plate. As can be gathered from FIG. 5, these cross slides each have of a hydraulic cylinder 10 for positioning and a slide block 11 that are each formed as a rack 12 along one longitudinal edge and each connected via a respective piston rod 13 with a respective piston 14. For actuating the cylinder pistons 14, the hydraulic cylinders 10 have connections 15 (FIG. 1) to an unillustrated pressure supply.

Figure 5:
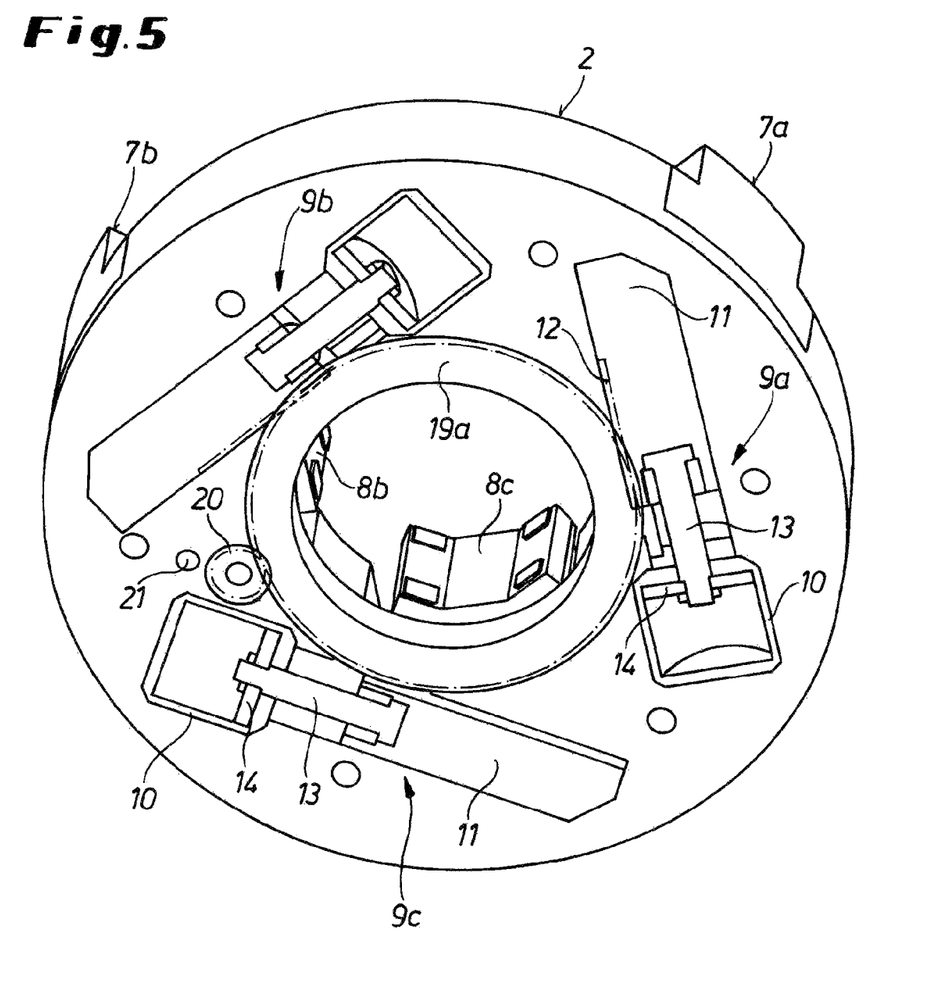
FIG. 5 is a perspective sectional view of the chuck of FIG. 1.

The slide blocks 11 each have a back face lying in the section plane of FIG. 5 and an opposite front face (see FIG. 6) formed with an angled guide groove 16 extending at an angle 18 of preferably 30° to the tangential axis of the respective block and in which engage respective follower claws 17 of the jaw slides 7a, 7b, and 7c. Pressurization of the hydraulic cylinders 10 pushes the follower claws 17 by means of the guide grooves 16 so the jaws 8a, 8b, and 8c are shifted with the respective the jaw slides 7a, 7b, and 7c radially inward toward the chuck axis 5. The inclined extension with pressure angle 18 facilitates a fast, short positioning stroke of the jaws 8a, 8b, and 8c, of for example 50 mm with movement of the cross slides 9a, 9b, and 9c through a positioning stroke of 25 mm.

The cross slides 9a, 9b, and 9c are associated with respective gears 19a, 19b, and 19c (FIG. 8) in the chuck 1 that are concentric with the passage 4 and axially stacked with only the outer or front gear 19a visible in FIG. 5. The hydraulic cylinders 10 are thus coupled by the racks 12 of their slide blocks 11 with the respective gears 19a, 19b, and 19c. The gears 19a, 19b, and 19c can mesh with a coupling pinion 20 that is insertable and disengageable axially with respect to the chuck axis 5 (FIGS. 5 and 8), meshing in an inserted position with all the gears 19a, 19b, and 19c for synchronous movement of the three gears 19a, 19b, and 19c and thus of the jaw slides 7a, 7b, and 7c to centrally chuck a tube.

If, on the other hand, a compensating chucking is to be implemented, coupling pinion 20 is disengaged and subsequently engages only with one gear 19a, which is the outer one. Therefore, all three slide systems can move independently with the respectively connected gears, adjust to the tube off-center and chuck the tube.

Figure 8:
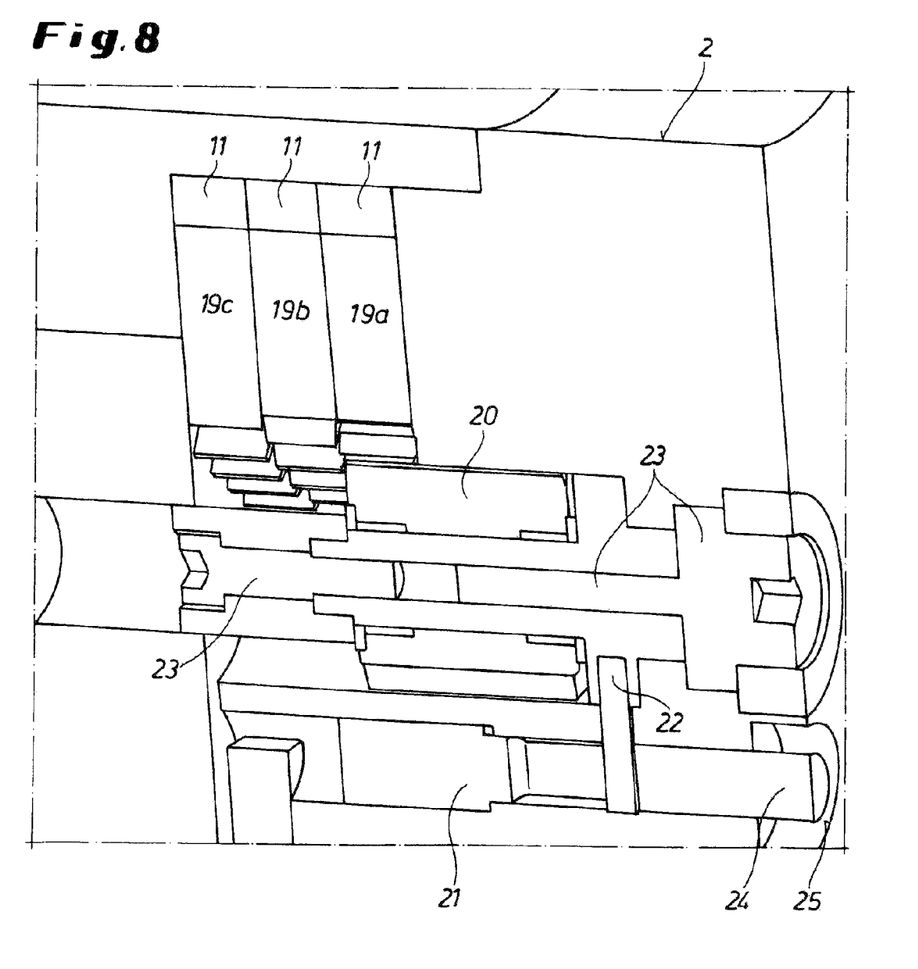
FIG. 8 shows a longitudinal cross view through a coupling pinion that can be inserted into and disengaged from three separate gears that are connected separately with respective jaw slides, as partial view of the chuck of FIG. 1 or FIG. 2.

As can be gathered from the partial section of the chuck shown in FIG. 8, an indicator bolt 21 is extends axially parallel to coupling pinion 20 and connected by a rod or link 22 with coupling pinion 20 to shift axially synchronously therewith. The coupling pinion 20 can be engaged or disengaged manually in the illustrated embodiment using threaded bolts 23, with the indicator bolt 21 shifting inward or outward so that a front end 24 indicates the current position, engaging into a recess (borehole) 25 of the chuck head plate 2 either more (coupling pinion 20 engaged with all gears 19a, 19b, and 19c) or less (coupling pinion 20 only meshed with the upper or front gear 19a).

The chuck 1 of FIGS. 1 and 5 to 8 is suitable both as a rear end and front end chuck and fulfils the required chucking functions of a centering chuck with direct alignment to the machine center and/or a compensating chucking of the tube to be machined.

Figure 2:
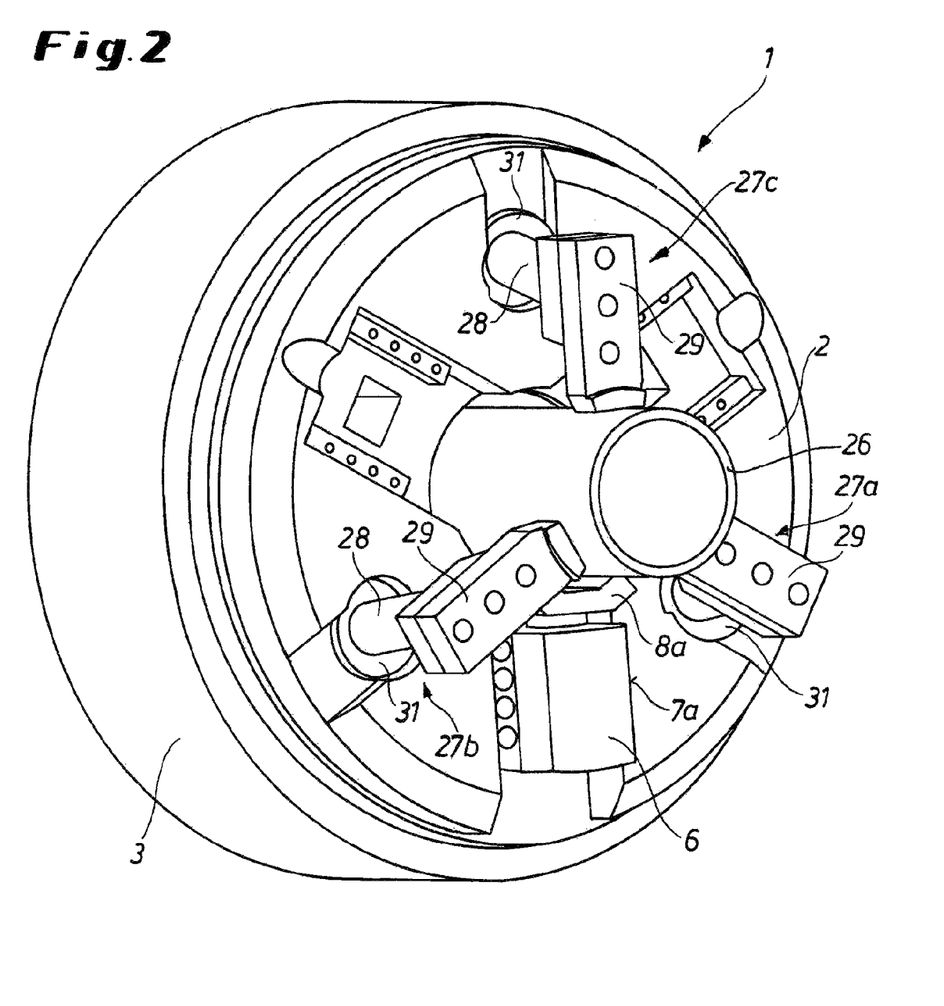
FIG. 2 shows a chuck as shown supplemented by way of contrast or in combination with centering slides that can be extended at an angle to the front for centered concentered chucking of the tube close to a thread to be cut.
Figure 3:
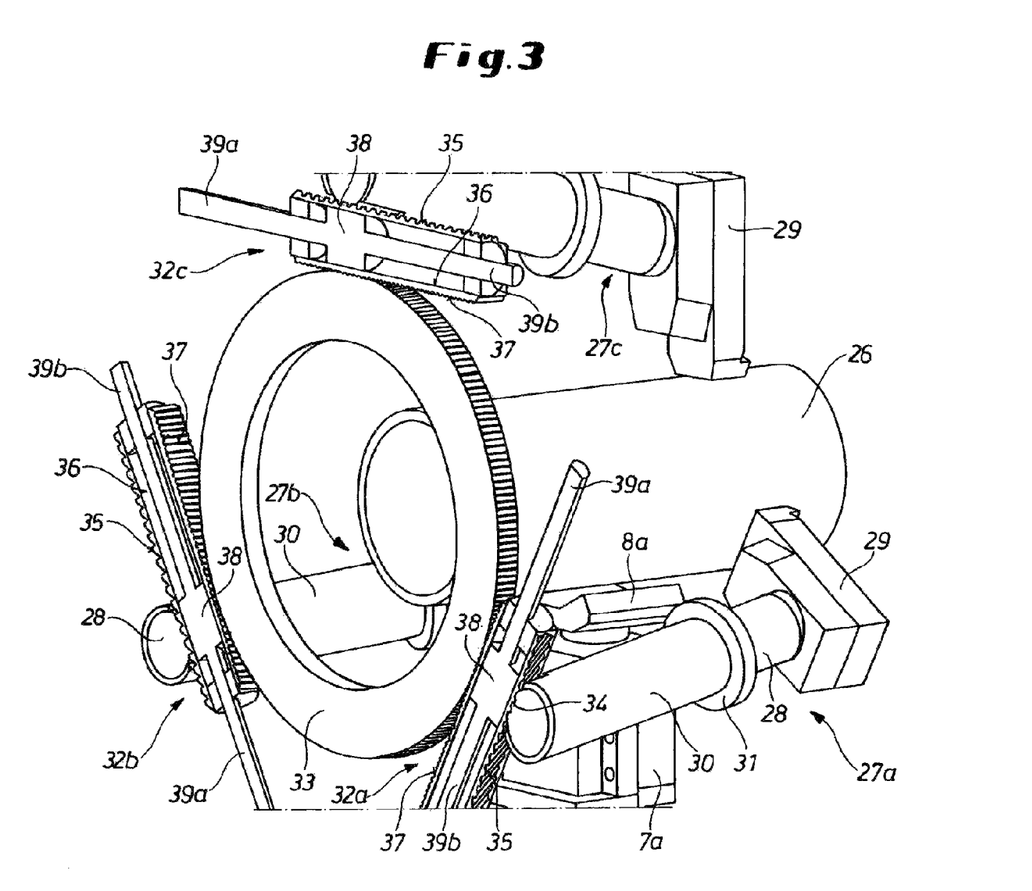
FIG. 3 shows only the arrangement of the centering slides with coupling via teeth with a centered gear wheel, as a detail of the chuck according to FIG. 2 in perspective view.
Figure 4:
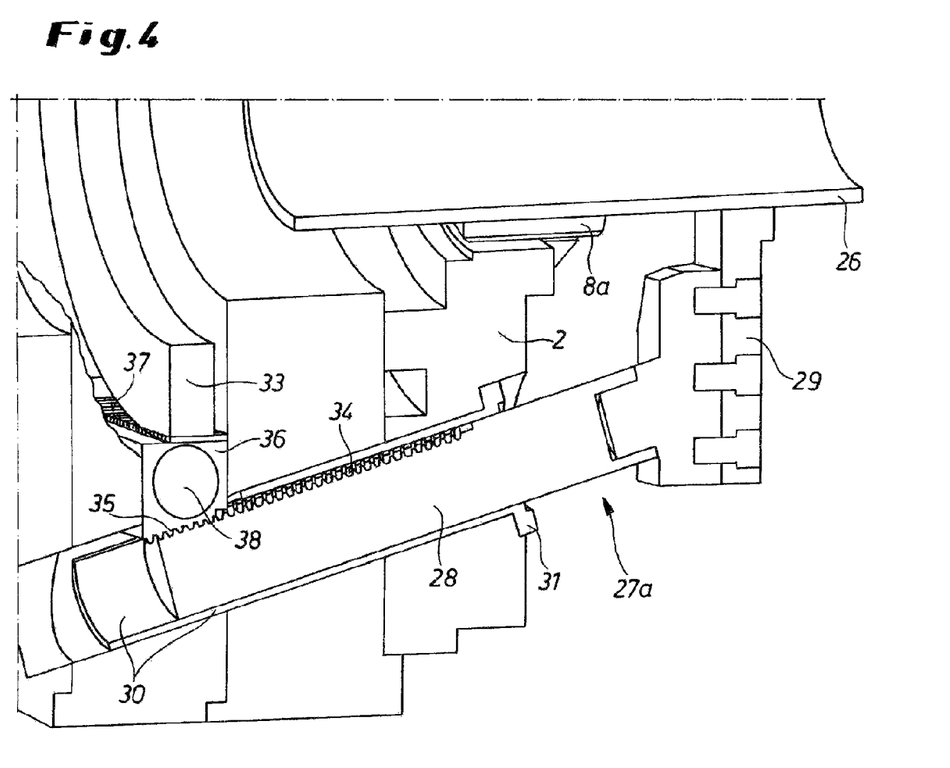
FIG. 4 is a longitudinal section through a centering slide with meshing of the drive and the central toothed gear, as a detail of FIG. 3.

If the chuck 1 of FIGS. 2 to 4 is also formed or combined with integrated centering jaw slides 27a, 27b, and 27c, the chuck 1 further combines the centering chucking of the tube 26 close to the thread being cut, maintaining the same mounting parts. Other external chucks are then no longer required.

As can be gathered from FIGS. 2 to 4, the three centering slides 27a, 27b, and 27c pass have respective centering slide rods inclined toward the tube 26 from the ring housing 3 and that pass forwardly through the chuck head plate 2. These centering rods 28 carry height-adjustable jaws 29 at their front, free ends and are each surrounded by a respective housing sleeve 30 having a mounting flange 31 that is fixed (bolted) in the chuck head plate 2.

The centering slides 27a, 27b, and 27c are coupled by respective drives 32a, 32b, and 32c with a central gear 33 that synchronizes the movements of the centering slides 27a, 27b, and 27c and that is located in the housing 3 of the chuck 1 behind the gears 19a, 19b, and 19c of the jaw slides 7a, 7b, and 7c of the chuck 1. For synchronous movement, the centering slides 27a, 27b, and 27c mesh with the respective drives 32a, 32b, and 32c that in turn mesh with the center gear 33. To this end, teeth 34 formed on each of the centering slide rods 27 [28] meshes through a cutout of the housing sleeve 30 of the respective centering slide 27a, 27b, and 27c (cf. FIG. 4) with angled teeth 35 on one side of the respective drive 32a, 32b, and 32c that are formed as hollow cylinders 36 while teeth 37 parallel to toothing 35 on an opposite side of the hollow cylinder 36 mesh with the center gear 33 (cf. FIG. 3).

Pistons 38 in the cylinders 36 of the drives 32a, 32b, and 32c can be locked in place by pressure, while still permitting linear movement of the respective hollow cylinders 36, so as to set the position of the respective slide rods 27a, 27b, and 27c and shift it outward or withdraw it toward the chuck head plate 2. For application of pressure and thus relative shifting of the hollow cylinders 36 relative to their pistons 38, pressure supply rods 39a and 39b extend from both ends of the piston 38 through the front ends of the respective cylinder 36 up to the wall of housing 3 of the chuck 1, via which the drives 32a, 32b, and 32c or their hollow cylinders 36 can be connected to a pressure means supply (not shown).

The invention claimed is:

1. A chuck for holding a tubular workpiece, the chuck comprising:
   a chuck body rotatable about a chuck axis and having an axially directed front plate;
   a plurality of chuck jaws angularly equispaced about and radially equispaced from the axis on the front plate;
   respective positioning means for radially shifting the chuck jaws on the front plate for gripping and releasing the workpiece at the axis;
   a plurality of elongated centering slides angularly equispaced about the axis and each having a radially inwardly directed edge formed with a row of inner-edge teeth and a radial outer edge formed with a row of outer-edge teeth;
   a common ring gear meshing with the inner-edge teeth of all of the centering slides;
   respective centering rods seated in the chuck body, each extending axially past the front plate at an acute angle to the chuck axis, and each having axially front and rear ends of which the front end is more closely juxtaposed with the chuck axis than the respective rear end;
   respective centering jaws carried on the front ends; and
   respective rows of rod teeth on radial inner edges of the centering rods meshing with the outer-edge teeth of the centering slides.

2. The chuck according to claim 1, wherein the centering slides are each formed as a hollow cylinder provided internally with a piston acted upon by pressure and having at both piston sides pressure supply rods extending from ends of the hollow cylinder for connection to a pressure supply source such that, upon pressurization of the one or other piston side of the respective piston, the hollow cylinder shifts the piston toward the one or the other side and in doing so axially advances or retracts the respective centering rod relative to the tube.

3. The chuck according to claim 1, wherein the centering rods are each surrounded by a respective housing sleeve provided with a mounting flange at it's a respective front end remote from the respective row of rod teeth for mounting in the chuck front plate.

4. The chuck according to claim 1, wherein the centering rods are each associated with a respective jaw slide in turn associated with a respective cross slide that is movable on the front plate by respective positioning means and having a slide block formed on one longitudinal side as a rack meshing with respective separate gears, each jaw slide being provided with a respective follower claw at its bottom side that serves to redirect movement of the respective cross slide into a movement of the respective jaw slide radially of the chuck axis and that is engaged with a link-type guide groove provided in the respective slide block of the respective cross slide, the gears being associated with an axial coupling pinion that can be inserted or disengaged axially of the chuck axis.

5. The chuck according to claim 4, wherein the cross slides and the jaw slides are cross one another at a pressure angle of the follower claw and the guide groove, the angle converting a positioning stroke of each of the cross slides with displacement reduction to a positioning stroke of the respective jaw slide.

6. The chuck according to claim 4, wherein the coupling pinion is insertable and disengageable and engaged with all three gears in an inserted end position, and only with one gear in a disengaged end position.

7. The chuck according to claim 4, wherein a respective cylinder of the positioning means of each of the cross slides whose slide blocks is connected via a respective piston rods with respective pistons.

8. The chuck according to claim 4, wherein an indicator bolt is mounted in the chuck front plate, extending axially parallel to the coupling pinion and shifting synchronously therewith with its front end section in front plate visible from the outside, and identifying an inserted or disengaged position of the coupling pinion.

9. The chuck defined in claim 1, wherein there are three such chuck jaws, centering jaws, centering slides, and centering rods with the chuck jaws angularly interleaved with the centering jaws.

\* \* \* \* \*